United States Patent
Gordon et al.

(10) Patent No.: US 9,449,264 B1
(45) Date of Patent: *Sep. 20, 2016

(54) EMBEDDED RADIO FREQUENCY IDENTIFICATION (RFID) PACKAGE

(71) Applicant: Maxim Integrated Products, Inc., San Jose, CA (US)

(72) Inventors: Jeff A. Gordon, Plano, TX (US); Robert Spencer, Garland, TX (US); Hamed Sanogo, Plano, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,641

(22) Filed: Nov. 30, 2015

Related U.S. Application Data

(63) Continuation of application No. 13/673,176, filed on Nov. 9, 2012, now Pat. No. 9,202,162.

(51) Int. Cl.
*G06K 7/08* (2006.01)
*G06K 19/02* (2006.01)
*G06K 19/06* (2006.01)
*G06K 19/07* (2006.01)
*G06K 7/10* (2006.01)

(52) U.S. Cl.
CPC ....... *G06K 19/0723* (2013.01); *G06K 7/10297* (2013.01); *G06K 7/10336* (2013.01)

(58) Field of Classification Search
USPC .......................................... 235/451, 488, 492
See application file for complete search history.

(56) References Cited

U.S. PATENT DOCUMENTS

| | | | |
|---|---|---|---|
| 5,696,666 A | 12/1997 | Miles et al. | |
| 6,319,827 B1 * | 11/2001 | Kowalski | G06K 19/07747 257/678 |
| 6,496,382 B1 * | 12/2002 | Ferguson | G06K 19/04 174/254 |
| 7,694,886 B2 | 4/2010 | Tan et al. | |
| 2005/0024290 A1 | 2/2005 | Aisenbrey | |
| 2006/0032926 A1 | 2/2006 | Baba et al. | |
| 2006/0091225 A1 | 5/2006 | Forster et al. | |
| 2006/0226237 A1 * | 10/2006 | Droz | B23K 1/0008 235/492 |
| 2007/0181988 A1 | 8/2007 | Han et al. | |
| 2008/0122630 A1 | 5/2008 | Baba et al. | |
| 2008/0171172 A1 | 7/2008 | Bae et al. | |
| 2008/0308641 A1 | 12/2008 | Finn | |
| 2011/0023289 A1 * | 2/2011 | Finn | G06K 19/07722 29/601 |
| 2011/0049249 A1 | 3/2011 | Kato et al. | |
| 2011/0062575 A1 | 3/2011 | Lin | |
| 2011/0084146 A1 * | 4/2011 | Owada | G06K 19/07784 235/492 |
| 2013/0062419 A1 | 3/2013 | Finn et al. | |
| 2014/0061314 A1 * | 3/2014 | Chan | G06K 19/07779 235/492 |

* cited by examiner

*Primary Examiner* — Tuyen K Vo
(74) *Attorney, Agent, or Firm* — Advent, LLP

(57) ABSTRACT

A radio frequency identification (RFID) device is described. In one or more implementations, the RFID device includes an integrated circuit (IC) die electrically connected to a radio frequency (RF) antenna winding for transmitting electronically stored information via the RF antenna winding. The RFID device also includes a substrate comprising a first core laminated to a second core. The RF antenna winding is routed through the first core and the second core. The first core defines a cavity for retaining the IC die. The cavity is disposed within the RF antenna winding in the first core.

20 Claims, 7 Drawing Sheets

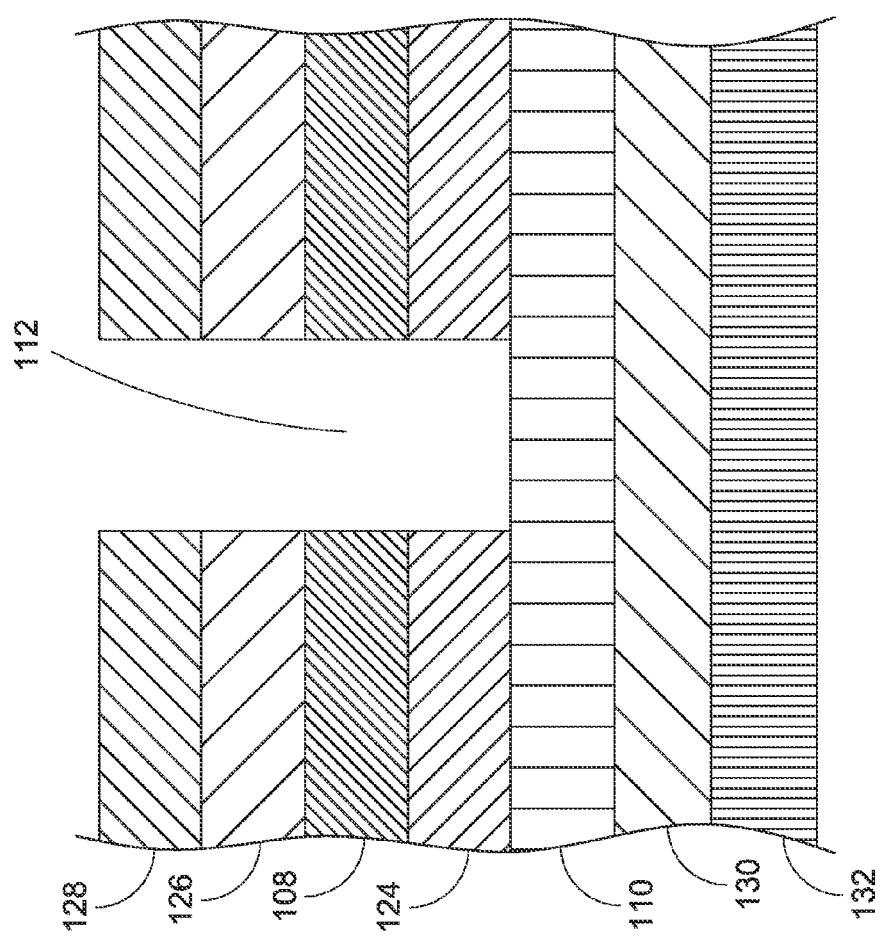

EMBEDDED RADIO FREQUENCY IDENTIFICATION (RFID) PACKAGE

CROSS-REFERENCE TO RELATED APPLICATIONS

The present application is a continuation under 35 U.S.C. §120 of U.S. patent application Ser. No. 13/673,176, filed Nov. 9, 2012, entitled "EMBEDDED RADIO FREQUENCY IDENTIFICATION (RFID) PACKAGE," which is hereby incorporated by reference in its entirety.

BACKGROUND

Radio frequency identification (RFID) technology generally refers to wireless non-contact systems that use radio frequency (RF) electromagnetic fields to transfer data. For example, data can be transmitted from a tag attached to an object. The data can be used to identify and track the object. Some RFID tags do not require battery power. For instance, an RFID tag can be powered by an electromagnetic field used to read the tag. Other RFID tags use a local power source and emit electromagnetic radiation at radio frequencies. RFID tags typically contain electronically stored information that can be read from a distance (e.g., up to several meters away). RFID tags are used in various industries. For example, an RFID tag can be attached to an automobile during production and used to track its progress through an assembly line. Additionally, RFID tags can be used to track pharmaceuticals (e.g., through a warehouse). Livestock and pets can also have RFID tags injected for identifying a particular animal. Further, RFID tags can be attached to clothing, possessions, and so forth.

SUMMARY

A radio frequency identification (RFID) device is described. In one or more implementations, the RFID device includes an integrated circuit (IC) die electrically connected to a radio frequency (RF) antenna winding for transmitting electronically stored information via the RF antenna winding. The RFID device also includes a substrate comprising a first core laminated to a second core. The RF antenna winding is routed through the first core and the second core. The first core defines a cavity for retaining the IC die. The cavity is disposed within the RF antenna winding in the first core.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference number in different instances in the description and the figures may indicate similar or identical items.

FIG. 1 is a partial isometric view illustrating an RFID device including a first core and a second core laminated together with an RF antenna winding routed through the first and second cores, where the first core defines a cavity for retaining a die electrically connected to the RF antenna winding so that the die is at least partially embedded inside the RF antenna winding in accordance with an example embodiment of the present disclosure.

FIG. 6 is a partial cross-sectional side elevation view illustrating a substrate for an RFID device, such as the RFID device shown in FIG. 1, in accordance with an example embodiment of the present disclosure.

DETAILED DESCRIPTION

Overview

Figure 1:
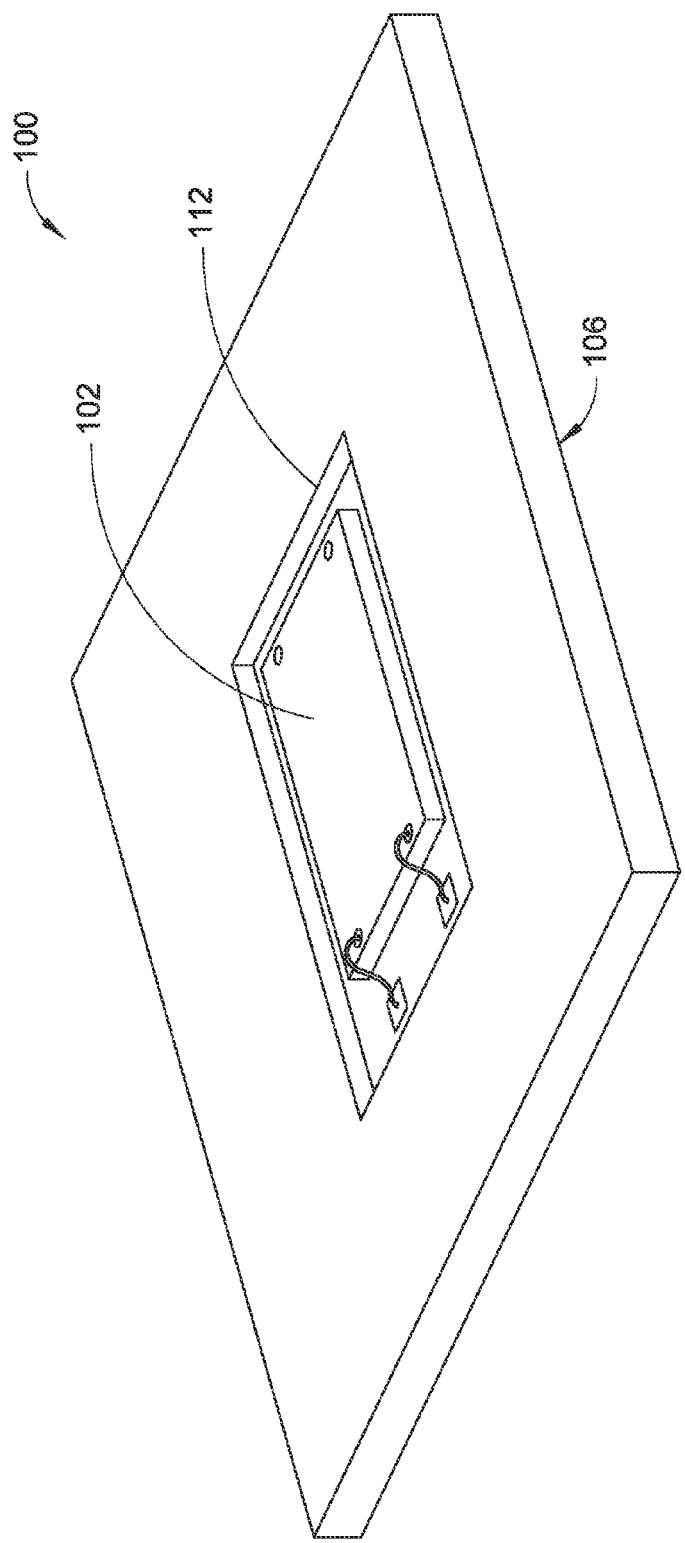
Figure 2:
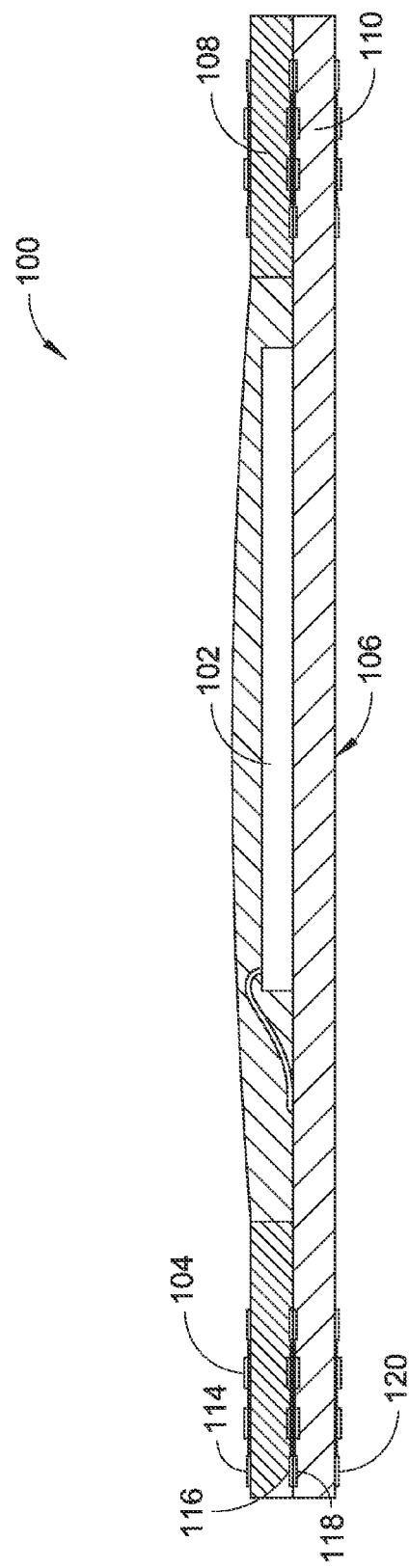
FIG. 2 is a cross-sectional side elevation view of the RFID device illustrated in FIG. 1.
Figure 3:
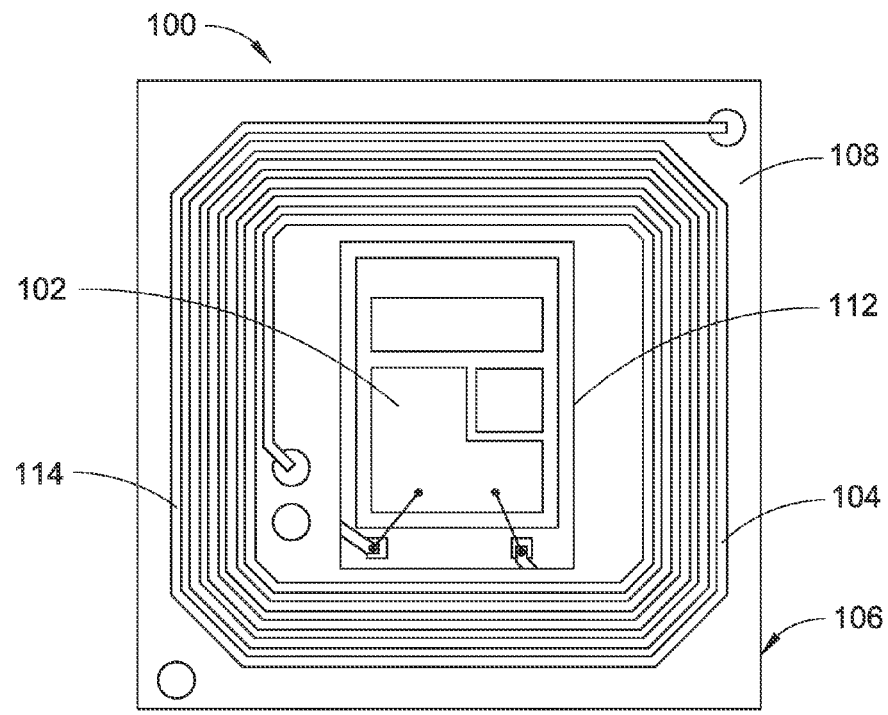
FIG. 3 is a partial top plan view of the RFID device illustrated in FIG. 1.
Figure 4:
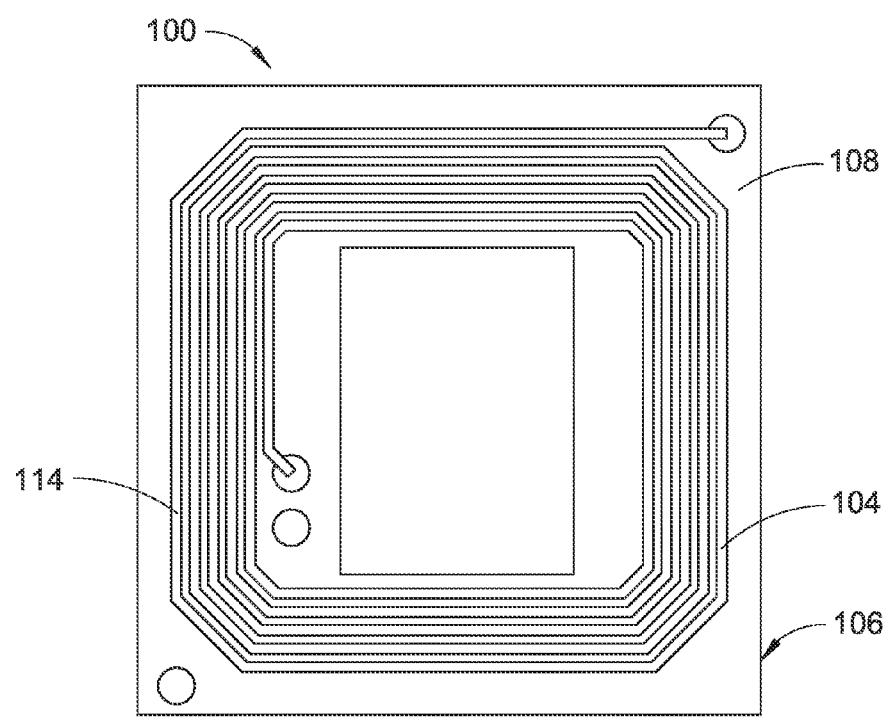
FIG. 4 is a top plan view of the RFID device illustrated in FIG. 1.
Figure 5A:
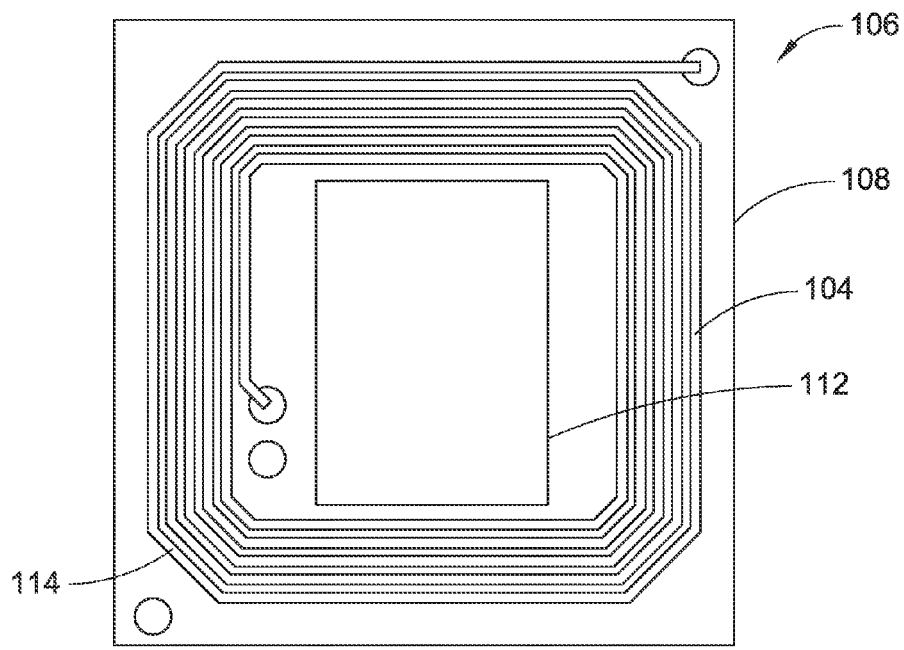
FIG. 5A is a top plan view of a first layer of a substrate for an RFID device, such as the RFID device illustrated in FIG. 1, in accordance with an example embodiment of the present disclosure.
Figure 5B:
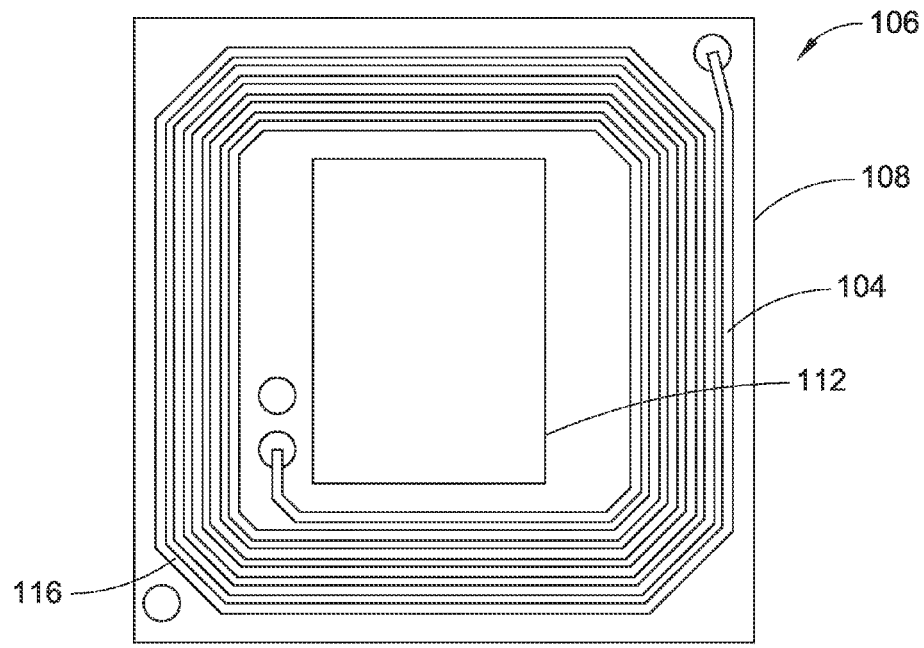
FIG. 5B is a top plan view of a second layer of a substrate for an RFID device, such as the RFID device illustrated in FIG. 1, in accordance with an example embodiment of the present disclosure.
Figure 5C:
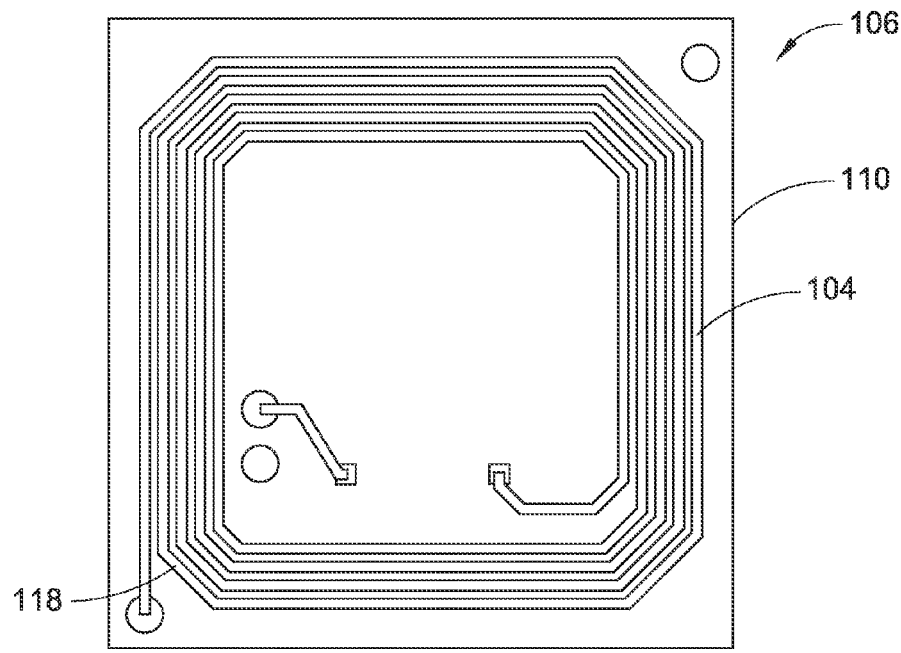
FIG. 5C is a top plan view of a third layer of a substrate for an RFID device, such as the RFID device illustrated in FIG. 1, in accordance with an example embodiment of the present disclosure.
Figure 5D:
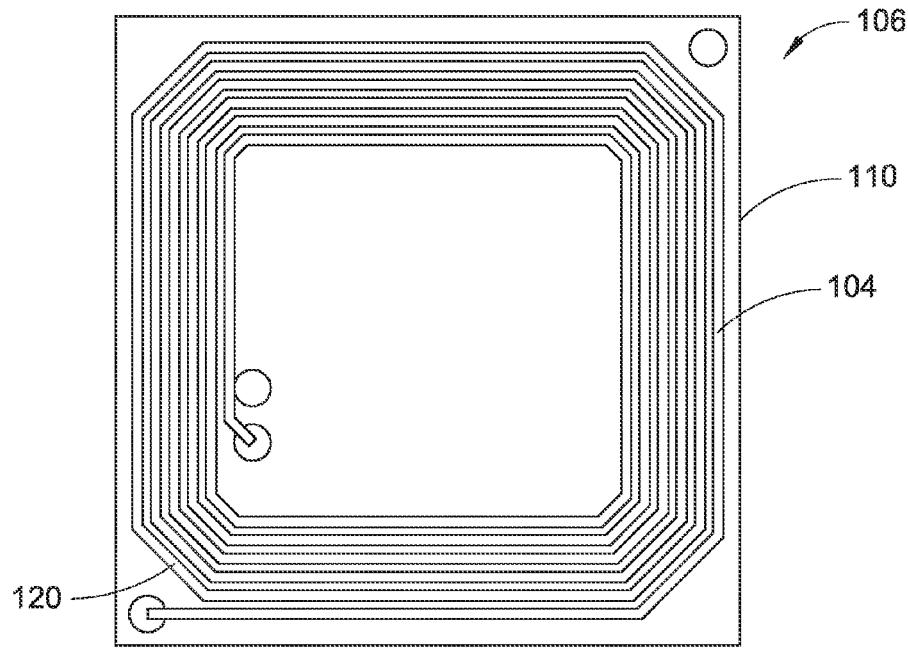
FIG. 5D is a top plan view of a fourth layer of a substrate for an RFID device, such as the RFID device illustrated in FIG. 1, in accordance with an example embodiment of the present disclosure.

RFID tags contain electronically stored information that can be read from a distance (e.g., up to several meters away). Data from RFID tags can be used to identify and track an object. For example, an RFID tag can be attached to a consumable or disposable item, such as an inkjet cartridge, a container of testing strips for use with a glucose meter, and so forth. In these configurations, the RFID tag can be used to authenticate an item (e.g., to distinguish a legitimate or original item from a counterfeit or replica item), calibrate equipment (e.g., in the case of a glucose meter), manage limited use or reuse of an item (e.g., to prevent reuse of a consumable with a limited lifespan), and so forth. However, it may be difficult to ensure that an RFID tag remains affixed to a particular object and/or is not tampered with. For instance, it may be difficult to affix an RFID tag to a smooth plastic surface, such as the wall of a container. It may also be difficult to include a tag with an object having a small form factor without interfering with the function of the object. Further, in some instances, environmental conditions encountered by an object having an affixed RFID tag can be detrimental to the tag, such as heat encountered by a tagged electronic component, or the like.

Accordingly, techniques are described for providing an RFID package having a low profile and small package thickness (e.g., less than about one-half millimeter (0.5 mm) in some embodiments). In embodiments, the RFID package is capable of surviving elevated temperatures, such as temperatures encountered during an injection molding process such as a plastic insert molding process. The RFID package can also be constructed using low cost fabrication techniques. In some embodiments, the RFID packages can withstand temperatures of up to about two hundred and eighty degrees Celsius (280° C.). Thus, the RFID devices can be capable of surviving injection molding. In this manner, an RFID device in accordance with embodiments of the present disclosure can be molded directly into a plastic object, such as a plastic sidewall of a printer cartridge, a container of testing strips, and so forth.

Example Implementations

Referring generally to FIGS. 1 through 6, example RFID devices are described. An embedded die RFID device 100 includes an integrated circuit (IC) die 102 electrically connected to a radio frequency (RF) antenna winding 104 for transmitting electronically stored information, and a multi-layer substrate 106 comprising a first core 108 laminated to a second core 110. The RF antenna winding 104 is routed through the first core 108 and the second core 110. The first core 108 defines a cavity 112 for retaining the IC die 102, and the cavity 112 is disposed within the RF antenna winding 104 in the first core 108 to form an open cavity in the substrate 106 so that the IC die 102 is at least partially embedded inside the RF antenna winding 104.

The RFID device 100 has embedded electronic capabilities, including memory for characteristic data storage of information that can be read from a distance. Thus, in embodiments, the IC die 102 is configured to electronically store information using a nonvolatile (NV) memory. The information can include, but is not limited to, identifying information for authentication, calibration, and so forth. For instance, the RFID device 100 can include security functionality to verify original equipment manufacturer (OEM) authenticity for an item an RFID device 100 is attached to or disposed within. In some embodiments, the RFID device 100 can be configured for simple touch authentication. The RFID device 100 can be configured to communicate using a short-range wireless communications protocol, such as a near field communication (NFC) standard. However, NFC is provided by way of example only and is not meant to be restrictive of the present disclosure. Thus, in other embodiments, the RFID device 100 can be configured to communicate using other protocols and standards.

In some embodiments, the RFID device 100 can be powered by an electromagnetic field used to read information stored on the RFID device 100. In other embodiments, the RFID device 100 can include an internal power source for powering transmission of the information stored on the RFID device 100. For example, the RFID device 100 can include a battery power source. The first core 108 and/or the second core 110 can comprise glass-reinforced epoxy laminate printed circuit board (PCB) material, such as FR4. In some embodiments, the FR4 material forming the substrate 106 can be about four hundred micrometers (400 μm) thick. However, this thickness is provided by way of example only and is not meant to be restrictive of the present disclosure. Thus, in other embodiments the substrate 106 can have a thickness of more or less than four hundred micrometers (400 μm). However, FR4 is provided by way of example only and is not meant to be restrictive of the present disclosure. Thus, in other embodiments, the first core 108 and/or the second core 110 can be fabricated using other PCB materials.

In some embodiments, the RF antenna winding 104 comprises four (4) layers of antenna winding to provide an enhanced read range. For example, as shown in FIGS. 5A through 5D, the first core 108 can comprise two layers of antenna winding 114 and 116, and the second core 110 can comprise two layers of antenna winding 118 and 120. However, four (4) layers of antenna winding are provided by way of example only and are not meant to be restrictive of the present disclosure. Thus, in other embodiments, more than four (4) layers (e.g., five (5) layers, six (6) layers, and so forth) or less than four layers (e.g., two (2) layers, three (3) layers, and so forth) can be used for the RF antenna winding 104. For example, the first core 108 can comprise one layer of antenna winding, and the second core 110 can also comprise one layer of antenna winding.

In embodiments of the disclosure, the IC die 102 is encapsulated on the substrate 106. For example, the IC die 102 can be encapsulated using an encapsulating material 122 such as an epoxy potting or molding material used to form an epoxy dome (e.g., in the form of a glob top). The encapsulating material 122 can be used to "pot" the cavity 112.

Referring now to FIG. 6, a stack up for the substrate 106 is described. As shown, substrate 106 includes first core 108 and second core 110, where the first and second cores are laminated together using an epoxy material, such as an epoxy material having pre-impregnated composite fibers (pre-preg) 124. In embodiments of the disclosure, the core material of the first core 108 may have a thickness ranging from approximately one hundred and eighty one-thousandths of a millimeter (0.180 mm) to two hundred and twenty-five one-thousandths of a millimeter (0.225 mm). The core material of the second core 110 may have a thickness ranging from approximately sixty-five one-thousandths of a millimeter (0.065 mm) to one hundred and five one-thousandths of a millimeter (0.105 mm). The pre-preg 124 may have a thickness ranging from approximately five one-hundredths of a millimeter (0.05 mm) to seven one-hundredths of a millimeter (0.07 mm).

Plating copper 126 and a solder mask 128 may be positioned on the first core 108, and plating copper 130 and a solder mask 132 may be positioned on the second core 110. The plating copper 126 and/or the plating copper 130 may have thicknesses ranging from approximately ten one-thousandths of a millimeter (0.010 mm) to twenty one-thousandths of a millimeter (0.020 mm), and the solder mask 128 and/or the solder mask 132 may have thicknesses ranging from approximately ten one-thousandths of a millimeter (0.010 mm) to twenty one-thousandths of a millimeter (0.020 mm). In some embodiments, the thickness of the substrate 106 may be approximately eighteen one-thousandths of an inch (0.018 in.), and the depth of the cavity 112 may be about twenty-five one-hundredths of a millimeter (0.25 mm). However, this stack up is provided by way of example only and is not meant to be restrictive of the present disclosure. Thus, in other embodiments, materials having varying thicknesses can be used to form the substrate.

Example Fabrication Process

Figure 7:
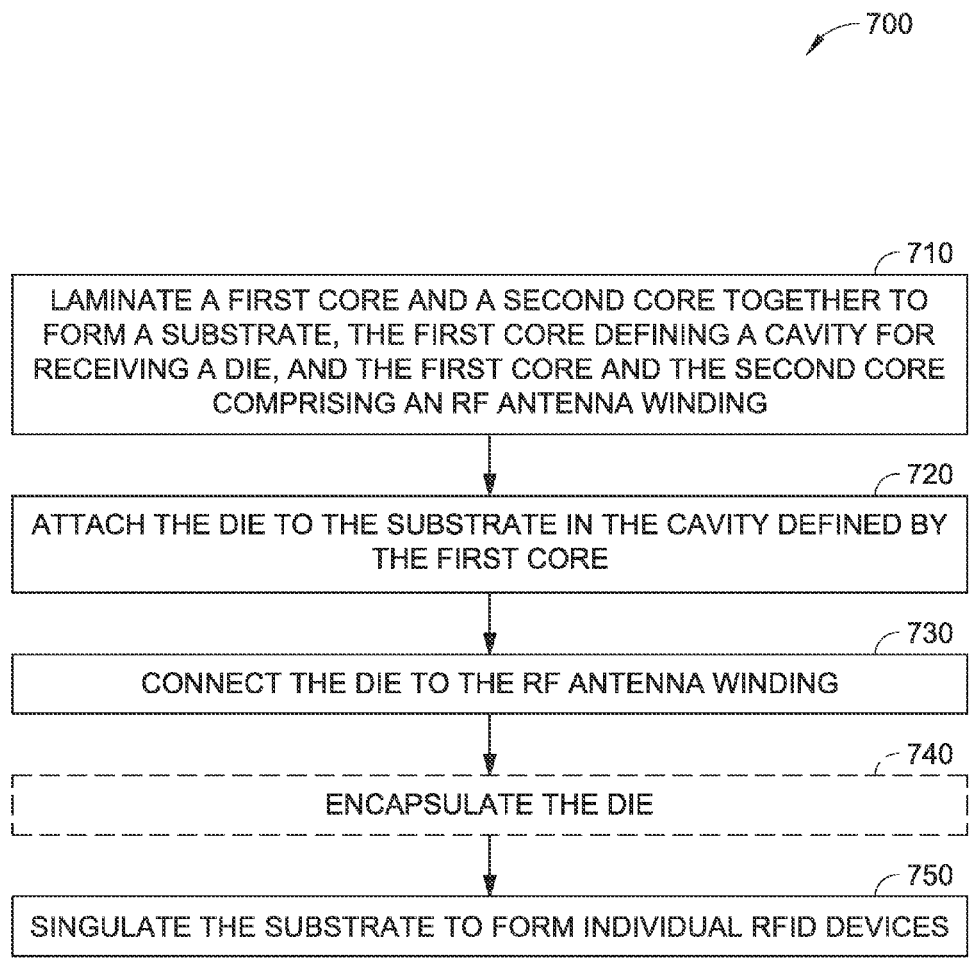
FIG. 7 is a flow diagram illustrating a method for fabricating an RFID device, such as the RFID device shown in FIG. 1, in accordance with an example embodiment of the present disclosure.

The following discussion describes example techniques for fabricating an RFID package including a die encapsulated in a cavity formed in a first core of a substrate. FIG. 7 depicts a process 700, in an example implementation, for fabricating a semiconductor device, such as the example embedded die RFID device 100 illustrated in FIGS. 1 through 6 and described above.

In the process 700 illustrated, a first core and a second core are laminated together to form a substrate, where the first core defines a cavity for receiving a die, and the first and second cores comprise an RF antenna winding (Block 710). For example, with reference to FIGS. 1 through 6, an open cavity 112 can be pre-punched in the first core 108 of the substrate 106 for retaining the IC die 102. However, pre-punching the cavity 112 is provided by way of example only and is not meant to be restrictive of the present disclosure.

Thus, in other embodiments, the cavity 112 can be routed in the first core 108 of the substrate 106. The RF antenna winding 104 comprises continuous antenna winding routed through multiple layers of the RFID device 100. In embodiments, openings (e.g., vias) can be created in the cores to facilitate conductive connections between the components of the RFID device 100 (e.g., using electroplating materials coated onto the interior surfaces of the vias). For example, vias can be used to connect the layers of antenna winding 114, 116, 118, and 120.

Next, the die is attached to the substrate in the cavity formed in the first core (Block 720). For instance, with continuing reference to FIGS. 1 through 6, the IC die 102 can be attached to the substrate 106 and connected to the RF antenna winding 104 using chip-on-board (COB) fabrication techniques. For example, the IC die 102 can be die attached or die mounted to the substrate 106. However, COB fabrication is provided by way of example only and is not meant to be restrictive of the present disclosure. Thus, in other embodiments, the IC die 102 can be connected to the substrate 106 using solder (e.g., solder pads). For instance, the IC die 102 can be connected to the substrate 106 using surface-mount technology (SMT). Then, the die is connected to the RF antenna winding (Block 730). For example, with continuing reference to FIGS. 1 through 6, wirebonding can be used to connect the IC die 102 to the RF antenna winding 104. Next, the die is encapsulated (Block 740). For instance, with continuing reference to FIGS. 1 through 6, the IC die 102 and the wires can be encapsulated (e.g., using the encapsulating material 122). Then, the substrate is singulated to form individual RFID devices (Block 750). For example, with continuing reference to FIGS. 1 through 6, an RFID device 100 can be formed by punching or sawing chips from a wafer formed with substrate 106 and multiple IC dies 102 disposed in cavities 112 formed in the substrate 106.

CONCLUSION

As used herein, the term "approximately" shall mean approximately and/or exactly with respect to the value or range of values specified. Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A radio frequency identification (RFID) device comprising:
   an integrated circuit (IC) die electrically connected to a radio frequency (RF) antenna winding for transmitting electronically stored information via the RF antenna winding;
   a first core comprising a first layer of the RF antenna winding, the first core defining a cavity for retaining the IC die; and
   a second core comprising a second layer of the RF antenna winding, the second core directly laminated to the first core so that the RF antenna winding is routed through the first core and the second core.

2. The RFID device as recited in claim 1, wherein the cavity is pre-punched in the first core before the first core is laminated to the second core to form the substrate.

3. The RFID device as recited in claim 1, further comprising at least one of a consumable item or a disposable item, wherein the substrate and the IC die are molded into a sidewall of the at least one of the consumable item or the disposable item during a plastic insert molding process.

4. The RFID device as recited in claim 1, wherein at least one of the first core or the second core comprises at least two layers of winding for the RF antenna winding.

5. The RFID device as recited in claim 1, wherein the IC die is configured to communicate via the RF antenna winding using a near field communication (NFC) standard.

6. The RFID device as recited in claim 1, wherein the IC die is at least one of die attached or surface mounted to the substrate.

7. The RFID device as recited in claim 1, wherein the IC die is encapsulated on the substrate.

8. A method of forming a radio frequency identification (RFID) device, the method comprising:
   directly laminating a first core and a second core together to form a substrate, the first core comprising a first layer of a radio frequency (RF) antenna winding, the first core defining a cavity for receiving an integrated circuit (IC) die, the second core comprising a second layer of the RF antenna winding, the radio frequency (RF) antenna winding routed through the first core and the second core so that the cavity is disposed within the RF antenna winding in the first core;
   attaching the IC die to the substrate in the cavity defined by the first core; and
   electrically connecting the IC die to the RF antenna winding.

9. The method as recited in claim 8, wherein the cavity is pre-punched in the first core before the first core is laminated to the second core to form the substrate.

10. The method as recited in claim 8, further comprising singulating the substrate to form an RFID device.

11. The method as recited in claim 10, further comprising insert molding the RFID device into a plastic sidewall of at least one of a consumable item or a disposable item.

12. The method as recited in claim 8, wherein at least one of the first core or the second core comprises at least two layers of winding for the RF antenna winding.

13. The method as recited in claim 8, wherein the IC die is configured to communicate via the RF antenna winding using a near field communication (NFC) standard.

14. The method as recited in claim 8, wherein attaching the IC die to the substrate in the cavity defined by the first core comprises at least one of die attaching the IC die to the substrate or surface mounting the IC die to the substrate.

15. The method as recited in claim 8, further comprising encapsulating the IC die on the substrate.

16. An embedded die RFID device comprising:
   an integrated circuit (IC) die electrically connected to a radio frequency (RF) antenna winding for transmitting electronically stored information via the RF antenna winding;
   a first core comprising a first layer of the RF antenna winding, the first core defining a cavity for retaining the IC die; and
   a second core comprising a second layer of the RF antenna winding, the second core directly laminated to the first core so that the RF antenna winding routed through the first core and the second core, wherein the cavity is disposed within the RF antenna winding in the first core, the first core and the second core comprising a substrate, wherein the IC die is encapsulated within the substrate.

17. The embedded die RFID device as recited in claim 16, wherein the cavity is pre-punched in the first core before the first core is laminated to the second core to form the substrate.

18. The embedded die RFID device as recited in claim 16, wherein at least one of the first core or the second core comprises at least two layers of winding for the RF antenna winding.

19. The embedded die RFID device as recited in claim 16, wherein the substrate comprises a thickness of less than or equal to at least approximately five hundred micrometers (500 μm).

20. The embedded die RFID device as recited in claim 16, wherein the IC die is at least one of die attached or surface mounted to the substrate.

* * * * *